US006185266B1

(12) United States Patent
Kuchi et al.

(10) Patent No.: US 6,185,266 B1
(45) Date of Patent: Feb. 6, 2001

(54) METHOD AND SYSTEM FOR GENERATING A POWER CONTROL METRIC IN AN ORTHOGONAL TRANSMIT DIVERSITY COMMUNICATION SYSTEM

(75) Inventors: Kiran Kuchi; Mansoor Ahmed, both of Fort Worth, TX (US)

(73) Assignee: Motorola, Inc., Schaumburg, IL (US)

( * ) Notice: Under 35 U.S.C. 154(b), the term of this patent shall be extended for 0 days.

(21) Appl. No.: 09/333,420

(22) Filed: Jun. 15, 1999

Related U.S. Application Data

(63) Continuation of application No. 08/946,210, filed on Oct. 7, 1997.

(51) Int. Cl.[7] .............................. H04B 7/08; H04L 1/02
(52) U.S. Cl. ............................. 375/347; 455/135
(58) Field of Search .................... 375/316, 346, 375/347, 340, 341, 261, 262, 267; 455/526, 132, 134, 135, 137; 370/479; 371/43.8

(56) References Cited

U.S. PATENT DOCUMENTS

| 3,986,124 | * | 10/1976 | Mitchell, Jr. ...................... 455/137 |
|---|---|---|---|
| 4,450,585 | * | 5/1984 | Bell ..................................... 455/135 |
| 5,325,403 | * | 6/1994 | Siwiak et al. ...................... 375/347 |
| 5,465,271 | * | 11/1995 | Hladik et al. ....................... 375/347 |
| 5,493,584 | * | 2/1996 | Emeott ................................ 375/340 |
| 5,542,119 | * | 7/1996 | Grube et al. ...................... 455/51.2 |
| 5,719,871 | * | 2/1998 | Helm et al. ......................... 370/479 |
| 5,809,090 | * | 9/1998 | Buternowsky et al. ............ 375/267 |
| 5,841,816 | * | 11/1998 | Dent et al. ......................... 455/137 |
| 5,884,215 | * | 3/1999 | Birchler et al. .................... 701/207 |
| 5,940,452 | * | 8/1999 | Rich .................................... 455/133 |
| 5,946,346 | * | 8/1999 | Ahmed et al. ..................... 375/219 |
| 6,014,570 | * | 1/2000 | Wong et al. ....................... 455/500 |

* cited by examiner

Primary Examiner—Tesfaldet Bocure
(74) Attorney, Agent, or Firm—L. Bruce Terry

(57) ABSTRACT

In a wireless communications system having a transmitter that transmits a transmit diversity signal using multiple antennas, a channel quality metric is computed by measuring a first and second diversity branch signal quality for first and second diversity branches in the receiver. Thereafter, the channel quality metric is computed in response to a difference between the first and second diversity branch signal qualities. The first and second diversity branch signal quality measurements may be signal-to-noise measurements. In one embodiment, the channel quality metric is computed by taking a square root of a product of signal-to-noise ratios of the first and second diversity branches in the receiver.

16 Claims, 4 Drawing Sheets

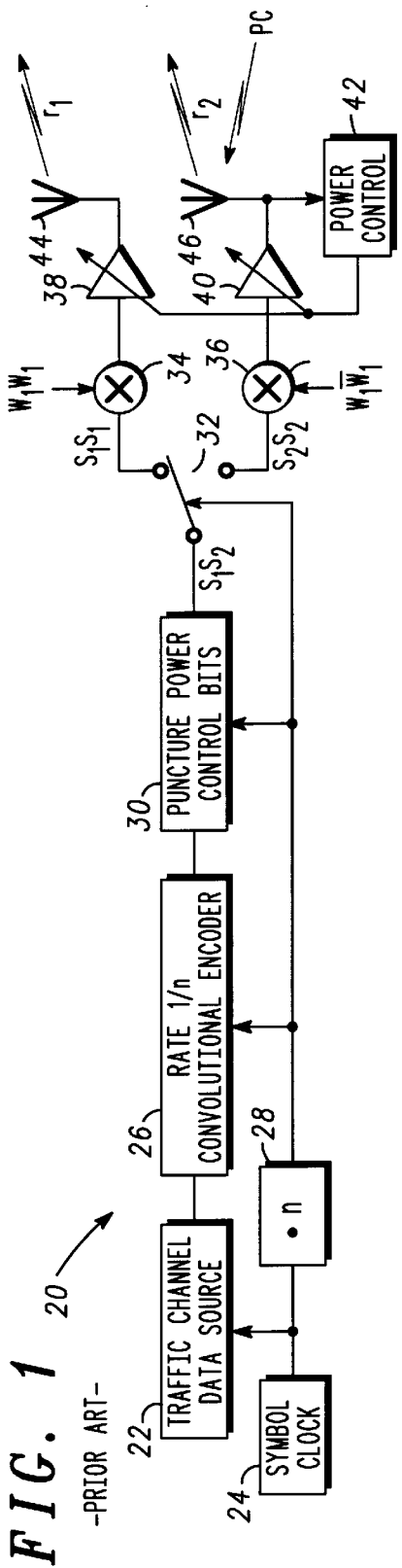
*FIG. 1* —PRIOR ART—
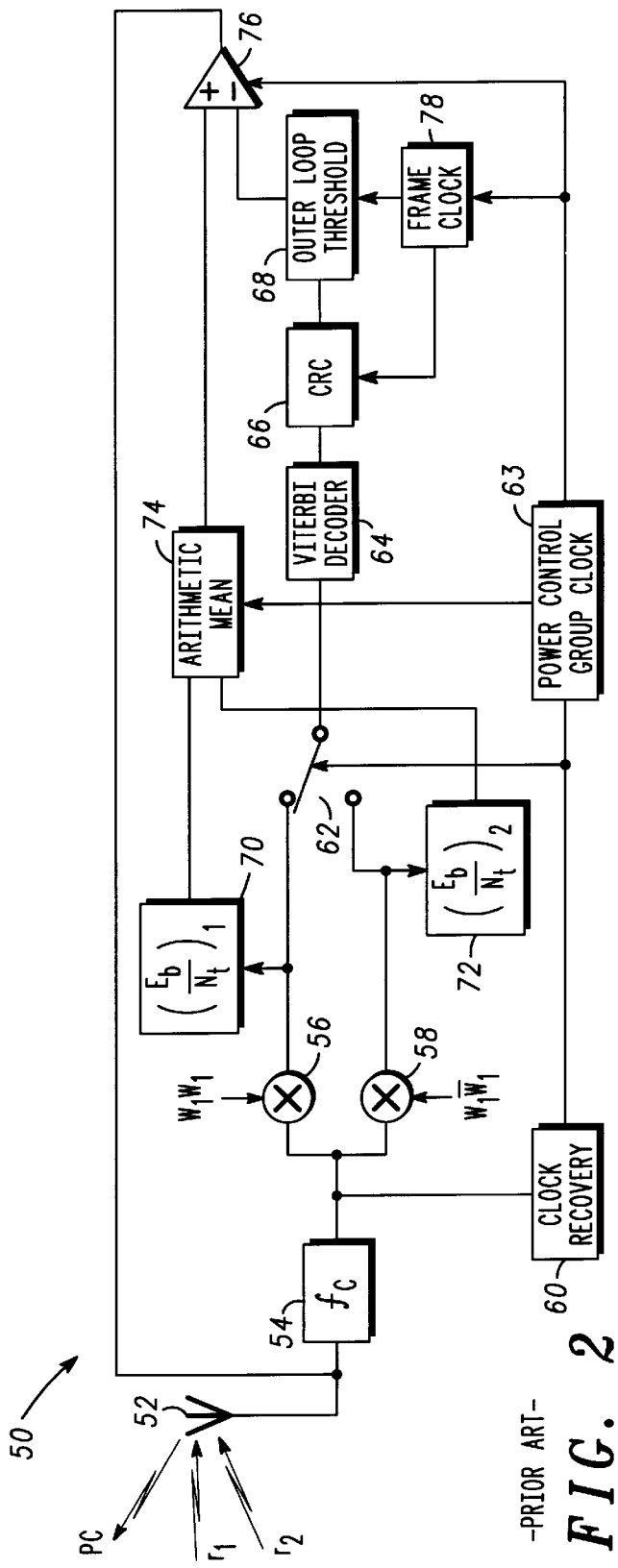
*FIG. 2* —PRIOR ART—

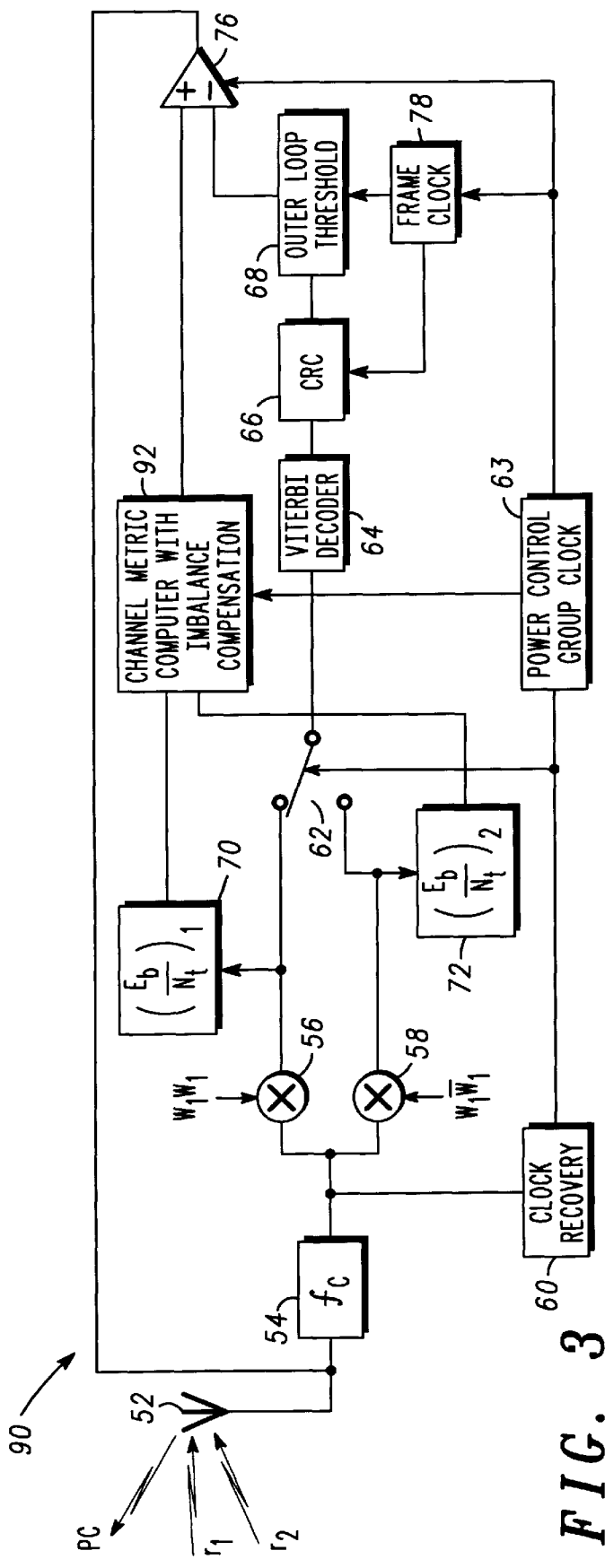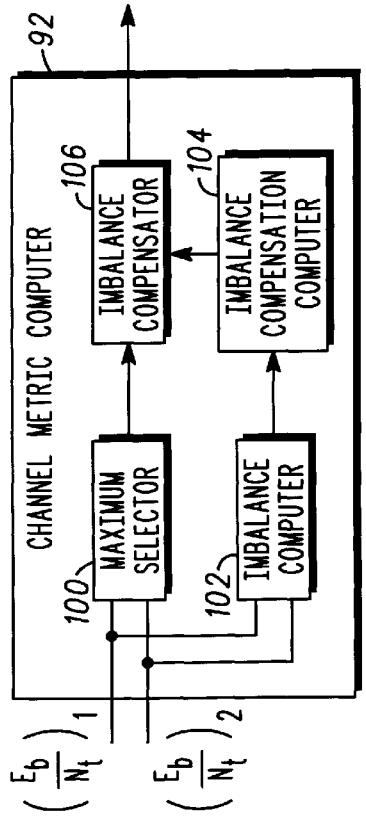

METHOD AND SYSTEM FOR GENERATING A POWER CONTROL METRIC IN AN ORTHOGONAL TRANSMIT DIVERSITY COMMUNICATION SYSTEM

CROSS REFERENCE TO RELATED APPLICATIONS

The following application is a continuation of application Ser. No. 08/946,210 entitled "METHOD AND APPARATUS FOR GENERATING A POWER CONTROL COMMAND IN A WIRELESS COMMUNICATIONS SYSTEM", filed on Oct. 7, 1997, which is hereby incorporated by reference.

FIELD OF THE INVENTION

The present invention is related in general to wireless communication systems, and more particularly to an improved method and system for generating a power control metric in an orthogonal transmit diversity communications system.

BACKGROUND OF THE INVENTION

In many wireless communications systems, and especially in cellular communication systems, it is important to control the transmitted power of a traffic channel in order to reduce cochannel interference. Cochannel interference is generated by other transmitters assigned to the same frequency band as the desired signal. And because all users transmit traffic on the same carrier frequency in a code division multiple access (CDMA) cellular system, reducing cochannel interference in CDMA systems is especially important because it directly impacts system capacity. If the cochannel interference is reduced, the CDMA system capacity may be increased. Therefore, it is a design goal to transmit a traffic signal with only an amount of power necessary to provide acceptable signal quality at the receiver, after it passes through the channel.

In this document, a "channel" may be defined as a path or paths of communication through a medium between a transmitter and a receiver. If the medium is air and communication takes place with radio frequency (RF) signals, such a channel is typically affected by fading. A "traffic channel" may be defined as a channel that carries data, whether representing voice or other information generated by the user, which the user intends to transmit via the channel. The traffic channel may be distinguished from other channels used by the communication system, such as channels that may be used to transmit timing, control, or other information supporting system operation.

Power control systems in cellular communication systems should compensate not only for signal strength variations due to the varying distance between the base station transceiver and the subscriber unit, but should also attempt to compensate for channel quality fluctuations typical of a wireless channel. These fluctuations are due to the changing propagation environment between the transmitter, or base station, and the receiver, or subscriber unit, as the user moves in the service area.

Existing power control systems used in CDMA cellular systems that operate according to J-STD-008, published by the Joint Technical Committee on Wireless Access, use the measurement and reporting of cyclic redundancy check (CRC) errors at the subscriber unit to control the power of the traffic channel at the base unit. This method of power control in response to CRC errors is used to implement a slow "ramping" power control scheme. The "ramping" occurs because the traffic channel power is increased by a relatively large amount when the subscriber unit reports CRC errors. After the large power increase, which often eliminates the CRC errors for some subsequent period, the power is reduced by a relatively small amount for each subsequent frame transmitted. Eventually, the power is reduced to a point where another CRC error occurs, and the power is once again increased by a relatively large amount. If channel quality remains constant, a graph of power transmitted in the traffic channel resembles a saw tooth, with large power increases followed by a series of small power decreases.

One problem with this method of power control is the delay encountered between the degradation of channel quality and the request for a power increase and the subsequent actual increase in power. The delay in requesting a power increase is caused by waiting for a frame to be received, and then waiting for frame decoding and the detection of a cyclic redundancy check error. Once the CRC error is detected, it must be reported to the base station, and the base station must respond by increasing traffic channel power. In current CDMA systems, it takes 20 milliseconds (mS) to receive a frame. Thus, the rate at which CRC reports or power control commands are sent to the transmitter is 50 Hz. This delay in the power control loop periodically causes the base to transmit too much power on the traffic channel, such as when a relatively large increase in power is requested and granted just as the channel quality has reached a minimum and starts to improve. If the traffic channel has too much power, cochannel interference increases and system capacity decreases.

With reference now to FIG. 1, there are depicted relevant portions of transceiver 20 that uses orthogonal transmit diversity (OTD). As illustrated, traffic channel data source 22 provides a stream of symbols, which may represent voice or data traffic of a plurality of users or channels. The rate that symbols are output from data source 22 is controlled by symbol clock 24.

Symbols from traffic channel data source 22 are convolutionally encoded by convolutional encoder 26. Convolutional encoder 26 encodes at a rate of one divided by "n". This means that for every symbol entering convolutional encoder 26, n encoded symbols are output. Clock multiplier 28 provides a clock for convolutional encoder 26 that is n times the rate of symbol clock 24.

After traffic channel data symbols have been encoded, power control encoder 30 places uplink power control information into the stream of encoded symbols. In one proposed system, this is accomplished by inserting a power control bits in a predetermined bit locations in power control groups of a frame in the data stream. Thus, some traffic channel data bits are replaced, or punctured, by bits intended to direct the subscriber unit to raise or lower its transmit power level. The frequency at which power control bits are punctured remains at a predetermined frequency, which in a preferred system is 800 Hz. Additionally, the power level of the punctured power control bits are set at the full vocoder rate traffic power level. The power control bits are preferably evenly distributed among the transmit antennas.

After the power control bits are inserted in the data stream, commutator 32 distributes symbols among diversity branches of the orthogonal transmit diversity transmitter. As shown in transceiver 20, there are two diversity branches defined by paths through spreaders 34 and 36, which paths use different spreading codes to spread the symbols in each branch.

After the symbols are spread with multiple orthogonal spreading codes, the spread data outputs are amplified by amplifiers 38 and 40. Amplifiers 38 and 40 are coupled to power controller 42 which controls the gain of amplifiers 38 and 40.

The outputs of amplifiers 38 and 40 are each coupled to separate antennas 44 and 46, which provide different signals that propagate through different paths $r_1$ and $r_2$, before they may be received by a subscriber unit. Also note that one or both antennas, such as antenna 46, may be used to receive power control information PC transmitted from a subscriber unit. This power control information is coupled to power controller 42 so that power controller 42 may set the gain of amplifiers 38 and 40.

With reference now to FIG. 2 there is depicted selected portions of a subscriber unit 50 according to the prior art. As shown, antenna 52 receives signals through paths $r_1$ and $r_2$, which carry traffic channel data and other control data. Antenna 52 is also used to transmit power control information PC to transceiver 20 shown in FIG. 1.

Antenna 52 is coupled to down converter and demodulator 54, which down converts and demodulates the received signals.

The output of downconverter and demodulator 54 is split to form diversity branches within subscriber unit 50. These diversity branches correspond to the antennas and diversity branches within transceiver 20. Thus, transceiver 20 in FIG. 1 is shown with two diversity branches, and subscriber unit 50 is also shown with two corresponding diversity branches.

The paths along diversity branches pass through despreaders 56 and 58, respectively. These despreaders use despreading codes similar to the spreading codes used in transceiver 20.

Clock recovery circuit 60 is also coupled to the output of downconverter and demodulator 54. Clock recovery circuit 60 produces a symbol clock that is used by decommutator 62 to reassemble the symbol stream within subscriber unit 50. The symbol clock is also used by power control group clock 63 to generate a clock having a frequency set at a power control group rate. Since in a preferred embodiment there are 16 power control groups in a 20 mS frame, the power control group rate may be 800 Hz.

The output of decommutator 62 is input into a decoder, such as Viterbi decoder 64, for decoding the convolutionally encoded data. Following decoder 64 CRC circuit 66 performs a cyclic redundancy check on a frame of data to determine whether or not an error has occurred. The output of CRC circuit 66 is coupled to outer-loop threshold circuit 68, which adjusts an outer-loop, or slower loop, threshold, which helps subscriber unit 50 maintain a selected frame error rate.

Subscriber unit 50 also uses fast power control, which is controlled by a faster inter-loop feedback mechanism which comprises signal-to-noise measurers 70 and 72 and an arithmetic mean calculator 74. In a preferred embodiment, signal-to-noise measurers 70 and 72 are coupled to the diversity branches of subscriber unit 50 for measuring a channel quality, such as a diversity signal-to-noise ratio, for each diversity branch. The outputs of signal-to-noise ratio measurers 70 and 72 are coupled to a arithmetic mean calculator 74, which calculates the arithmetic mean of the measured signal-to-noise ratios by adding them together and dividing by the number of signal-to-noise ratios. The arithmetic mean output by arithmetic mean calculator 74 is coupled to comparator 76, which outputs a power control bit to instruct transceiver 20 to increase or decrease transmit power. This information is transmitted from antenna 52 as shown at signal PC, which is also received at antenna 46 in transceiver 20 (see FIG. 1).

Note that arithmetic mean calculator 74 operates at an inter-loop rate, which in a preferred embodiment is 800 Hz, while CRC circuit 66 and outer loop threshold circuit 68 operate at a frame rate, which in a preferred embodiment is 50 Hz. Clock divider 78 is used to divide the clock down and set the relative clock rates between the inter-loop and outer-loop.

The fast power control system shown in the orthogonal transmit diversity system that includes transceiver 20 and subscriber unit 50 malfunctions when one of radio frequency paths $r_1$ and $r_2$ is in a deep fade, and when the rate of convolutional encoder 26 is rate one-half. In this case, half the symbols, which are transmitted from one antenna, are lost due to the fade, and the symbols received from the other antenna are received with CRC errors, or frame errors, due to power control bits punctured by power control encoder 30. Thus, every frame is received with an error in subscriber unit 50, which causes outer loop threshold 68 to be adjusted rapidly so that it is soon requesting maximum transmit power from amplifiers 38 and 40 in transceiver 20. When this occurs, the system assumes a malfunction and the call is dropped. Therefore, it should be apparent that a need exist for an improved method and system for generating a power control metric in an orthogonal transmit diversity communications system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1 depicts selected portions of a transceiver that uses transmit diversity according to the prior art;

FIG. 2 depicts selected portions of a subscriber unit that receives a transmit diversity signal according to the prior art;

FIG. 3 is a high-level block diagram of a subscriber unit that generates a channel quality metric in accordance with the method and system of the present invention;

FIG. 4 is a more detailed depiction of the channel quality metric computer shown in FIG. 3;

DETAILED DESCRIPTION OF THE INVENTION

Figure 5:
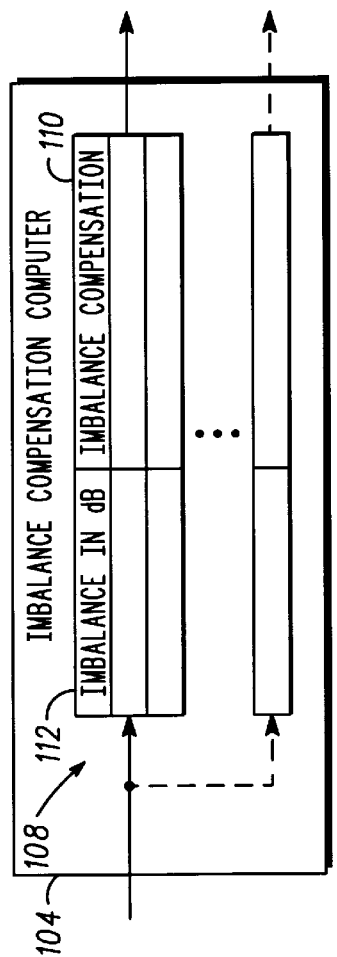
FIG. 5 is a more detailed illustration of the imbalance compensation computer shown in FIG. 4.

With reference now the figures, and in particular with reference to FIG. 3, there is depicted a high-level block diagram of a subscriber unit that generates a channel quality metric in accordance with the present invention. As shown, subscriber unit 90 contains many of the same functional components as subscriber unit 50 in FIG. 2. However, according to an important aspect of the present invention, channel metric computer 92 includes a channel imbalance compensator that contributes to the computation of a power control command that is a function of an imbalance between the quality of signals received in different diversity branches in the subscriber unit. By compensating for the imbalance between the diversity branches, the lowest quality signal may be given a greater emphasis, or greater weight, as the power control command is computed. By giving the lower quality signal a greater weight, the power requested by the subscriber unit will increase sooner so that a frame error may be avoided. Avoiding this frame error is intended to prevent a request for a rapid power increase at the end of the frame wherein one of the diversity branches has entered a deep fade.

Referring now to FIG. 4, there is depicted the channel quality metric computer that is shown in FIG. 3. As illustrated, channel quality metric computer 92 includes maximum selector 100, imbalance computer 102, imbalance compensation computer 104, and imbalance compensator 108. Maximum selector 100 receives channel quality measurements from each diversity branch in subscriber unit 90 and selects and outputs the maximum value. In a preferred embodiment, the channel quality measurements are signal-to-noise ratio measurements.

Imbalance computer 102 determines a magnitude of the difference between the channel quality measurements of the diversity branches. For example, in an embodiment with two diversity branches, imbalance computer 102 determines the difference between two channel quality measurements and outputs this difference to imbalance compensation computer 104. This may be implemented by calculating the absolute differences in dB between the channel quality measurements of the diversity branches.

Imbalance compensation computer 104 determines a value of an imbalance compensation factor in response to input from imbalance computer 102. In one embodiment, such as the embodiment shown in FIG. 5, imbalance compensation computer 104 may include table 108 that is used to look up a particular imbalance compensation 110 in response to a particular imbalance 112, represented in dB. Therefore, an input from balance computer 102 is used to look up a value in table 108, and such value is output by imbalance compensation computer 104.

Figure 6:
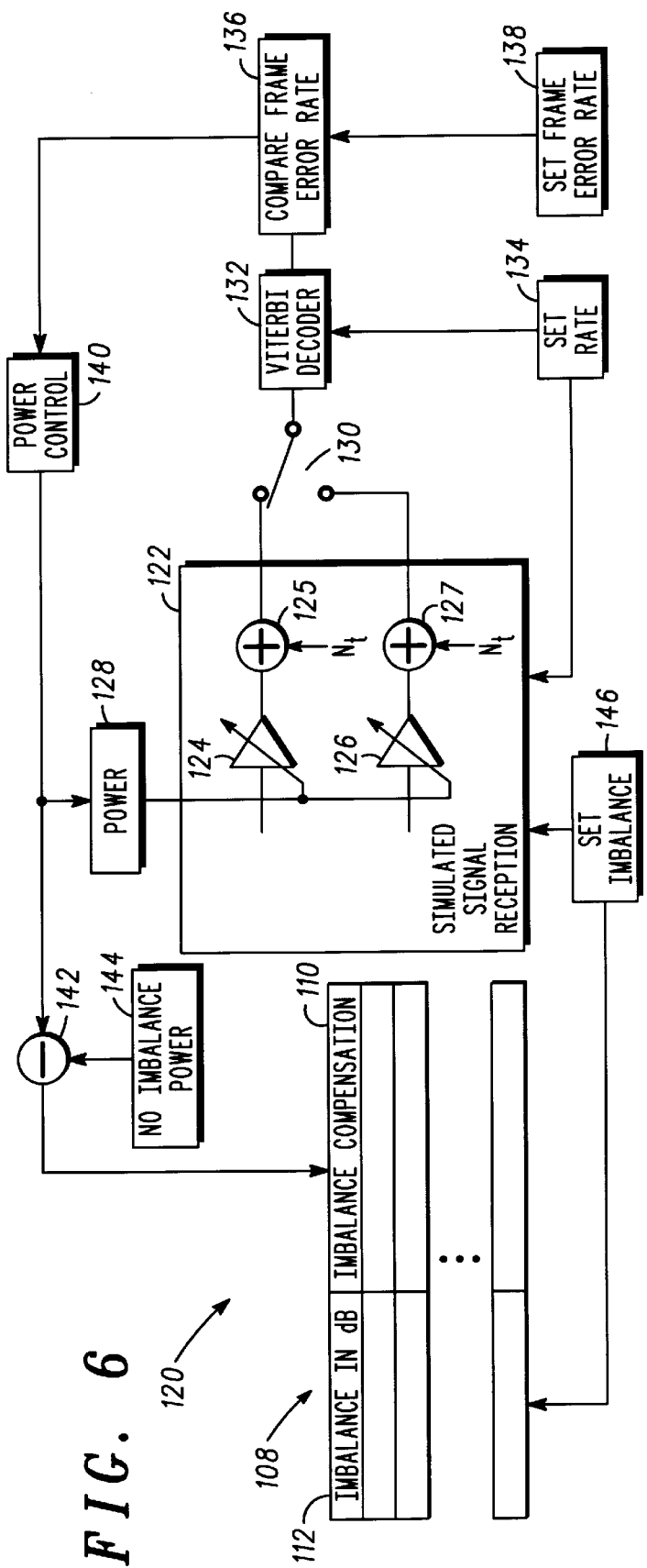
FIG. 6 is a transmit diversity reception simulator for simulating diversity branch imbalance conditions according to the method and system of the present invention.

In order to compute values in table 108, a simulator, such as simulator 120 shown in FIG. 6, may be used. In simulator 120, reception simulator 122 is used to provide despread symbols that have been affected according to a simulated channel. For example, the outputs of reception simulator 122 are like the symbol streams input into spreaders 34 and 36 (see FIG. 1), respectively, as they would be affected by simulated channels $r_1$ and $r_2$.

Within reception simulator 122 are variable gain amplifiers 124 and 126, which may used by power controller 140 to set the gain of the diversity branches, as if the gain were set in a diversity transmitter. Also within reception simulator 122 are noise adders 125 and 127 that add independent noise samples to the generated signals to simulate the noise in channels $r_1$ and $r_2$.

The outputs of reception simulator 122 are input into decommutator 130, which reassembles the symbols in the proper order as they come from the simulated diversity branches through amplifiers 124 and 126, respectively.

Following decommutator 130, decoder 132 decodes the encoded symbol stream according to a convolutional coding rate set in rate register 134. In a preferred embodiment, decoder 132 is a Viterbi decoder, and the convolutional coding rate is one-half.

The output of decoder 132 is coupled to frame error rate comparator 136, which compares the frame error rate of decoder 132 to a target frame error rate stored in frame error rate register 138. If the frame error rate from decoder 132 exceeds the target frame error rate in frame error rate register 138, power control circuit 140 determines a power level increase that is needed to bring the measured frame error rate close to the target frame error rate. The output of power controller 140 is coupled to power level register 128, which stores the current gain setting for amplifiers 124 and 126.

The output of power controller 140 is also coupled to subtractor 142 which subtracts the current power level from the power level used to set a target frame error rate with no imbalance between diversity branches. Such a "no imbalance" power level is stored in register 144. The value output by subtractor 142 is stored as imbalance compensation 110 in table 108. In a preferred embodiment, imbalance compensation 110 is represented in dB.

The values stored in imbalance column 112 of table 108 come from imbalance setting 146. Typically, this imbalance value would begin at 0, which allows a measurement of the "no imbalance" power level that is stored in register 144, and increase up to a level that simulates a deep fade in a diversity branch. Setting an imbalance may be accomplished either by setting the relative amplitudes of simulated symbol streams, or by setting the relative amounts of simulated noise added to the symbol streams.

With reference again to FIG. 4, imbalance compensator 106 receives an imbalance compensation factor from imbalance compensation computer 104. In a preferred embodiment, the output of maximum selector 100 is divided by the imbalance compensation factor to produce the channel quality metric. Thus, the maximum channel quality measurement is compensated earlier than in the prior art because compensation is based upon a detection of an imbalance between the diversity branches. In a prior art, arithmetic mean calculator 74 may indicate that the receiver has enough signal quality, and therefore not request a power increase until it is to late for the receiver to avoid several frames having errors. In contrast, the present invention asks for an increase in power soon enough to avoid a frame error in a current frame, thus avoiding several consecutive frames with errors.

Figure 7:
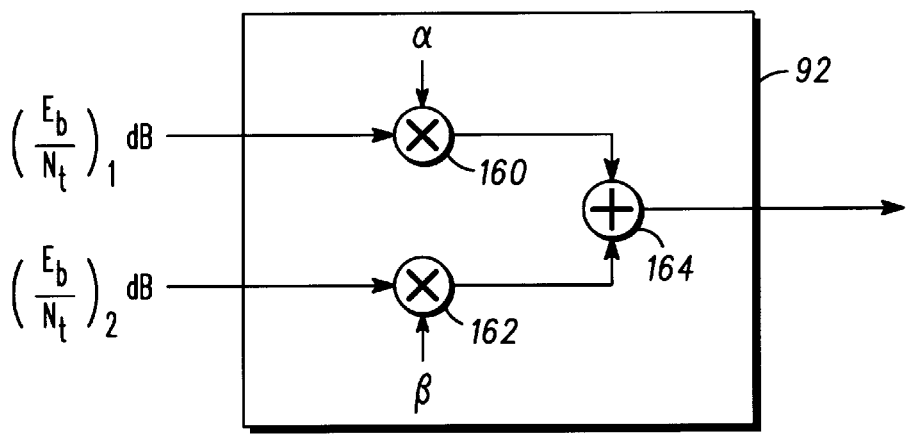
FIG. 7 illustrates yet another embodiment of a channel quality metric computer in accordance with the method and system of the present invention.

Referring now to FIG. 7, there is depicted another embodiment of channel metric computer 92. As a result of analyzing a graph of data points represented in table 108, the mathematical approximation of such a graph is represented by multipliers 160 and 162, and by adder 164. In this embodiment channel quality for each diversity branch is input in dB into channel metric computer 92. Then each channel quality measurement is multiplied by a constant, shown here as $\alpha$ and $\beta$. These products are then added in adder 164, with the result being the channel metric. In a preferred embodiment, $\alpha$ and $\beta$ are equal to 0.5, in which case the channel quality metric is the geometric mean of two diversity branch signal qualities, which may be expressed as:

$$\text{Channel Quality Metric} = \sqrt{\left(\frac{E_b}{N_t}\right)_1 \left(\frac{E_b}{N_t}\right)_2}$$

Therefore, in the case where $(E_b/N_t)_1$ is the maximum diversity branch signal quality, it may be selected and multiplied by an imbalance compensation factor computed by the equation:

$$\text{Imbalance Compensation Factor} = \sqrt{\frac{\left(\frac{E_b}{N_t}\right)_2}{\left(\frac{E_b}{N_t}\right)_1}}$$

By using this imbalance compensation factor, the result is the same as using $\alpha$ and $\beta=0.5$ in the channel metric computer shown in FIG. 7. Thus, it may be said that there is an implied imbalance compensation factor computed in channel metric computer 92 in the embodiment shown in FIG. 7.

Figure 8:
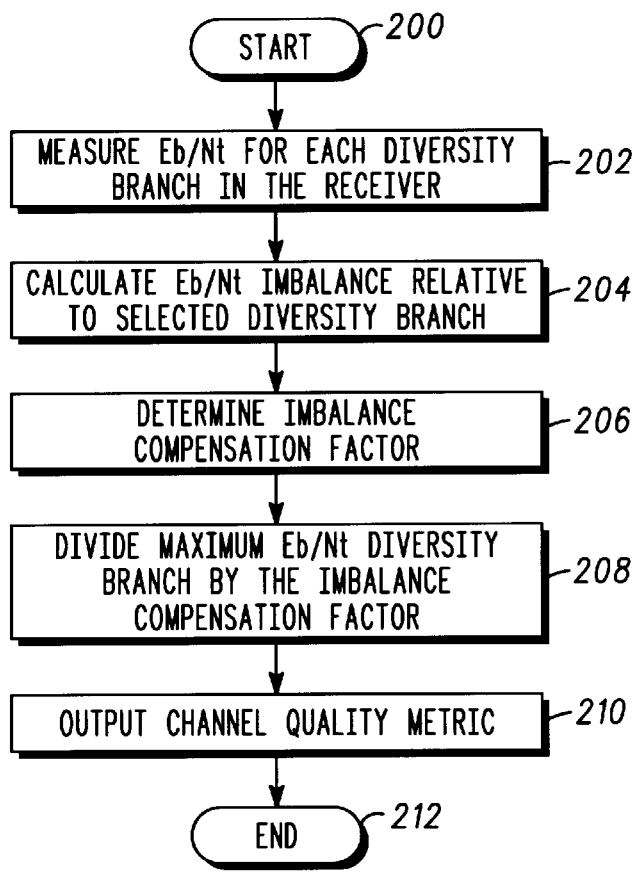
FIG. 8 is a high-level logic flowchart that illustrates the operation of the method and system of the present invention.

With reference now to FIG. 8, there is depicted a high-level flowchart that illustrates the operation of the method and system of the present invention. As shown, the process begins at block 200, and thereafter passes to block 202 wherein the process measures a signal quality for each diversity branch in the receiver. In a preferred embodiment, the measured signal quality is a signal-to-noise ratio $E_b/N_t$, which is an energy per bit divided by noise power per propagation path. If there are multiple propagation paths received from a single diversity antenna, the $E_b/N_t$ measurements for each path (e.g., for each finger in a rake receiver) for a diversity branch are added to make a single signal quality measurement for that branch.

Next, the process calculates a difference, or imbalance, between the measured diversity branch signal qualities, as illustrated at block 204. In a preferred embodiment, the imbalance in the signal-to-noise ratios relative to a selected diversity branch may be calculated. The selected diversity branch may be the diversity branch with the maximum signals-to-noise ratio.

After calculating an imbalance, the process determines an imbalance compensation factor, as depicted at block 206. In one embodiment of the present invention, the imbalance compensation factor may be looked up in a table based upon the calculated imbalance. Values in the table may be determined experimentally in a simulator, such as the simulator shown in FIG. 6. Alternatively, the imbalance compensation factor may be inherent in a mathematical computation such as shown in FIG. 7.

After determining the imbalance compensation factor, the process divides a selected diversity branch signal quality by the imbalance compensation factor, as illustrated at block 208. In a preferred embodiment, the maximum signal-to-noise ratio is divided by the imbalance compensation factor. By dividing the maximum diversity branch signal quality by the imbalance compensation factor that is proportional to the imbalance or difference between measured diversity branch signal qualities, the subscriber unit takes into account the signal imbalance between diversity branches and reduces the channel quality metric in what might be early in a frame time so that power at the transceiver might be increased over the remaining portion of the frame in order to avoid a frame error.

Finally, the process outputs the channel quality metric, as depicted at block 210, and the process of computing a channel quality metric ends, as shown at block 212. The channel quality metric output at block 210 is output by channel metric computer 92 in FIG. 3, and used by comparator 76 to compare it with the value of the outer loop threshold 68.

According to an important aspect of the present invention, the channel quality metric computed by channel metric computer 92 measures an imbalance, or difference, between measured signal qualities in selected diversity branches of a receiver. By computing a channel quality metric in response to this imbalance in diversity branches, the receiver is able to incrementally request additional power at a time the imbalance is detected, rather than requesting a larger amount of power later, at the end of the frame, when it is determined that the frame has an error because one of the diversity branches has experienced a deep fade, and the puncturing of power control bits has caused the frame to be in error.

The present invention reduces the value of the channel quality metric upon detecting an imbalance so that power will be requested at the time the imbalance is detected, even though one of the diversity branches may apparently have enough signal quality to meet the target frame error rate. Additional power is needed because the one diversity branch having enough power may contain errors introduced by punctured power control bits.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for computing a channel quality metric in a receiver in a wireless communications system, wherein a transmitter in the wireless communications system transmits a transmit diversity signal using multiple antennas, the method comprising the steps of:

measuring a first and second diversity branch signal quality for the transmit diversity signal received in first and second diversity branches in the receiver;

computing an imbalance compensation factor that is a function of a difference between the first and second diversity branch signal qualities; and computing the channel quality metric in response to the imbalance compensation factor.

2. The method for computing a channel quality metric according to claim 1 wherein the step of computing the channel quality metric in response to the imbalance compensation factor further includes dividing one of the first and second diversity branch signal quality measurements by the imbalance compensation factor.

3. The method for computing a channel quality metric according to claim 1 wherein the step of measuring a first and second diversity branch signal quality for the transmit diversity signal received in first and second diversity branches in the receiver further includes measuring a first and second diversity branch signal-to-noise ratio for the transmit diversity signal received in the first and second diversity branches in the receiver.

4. The method for computing a channel quality metric according to claim 3 wherein the step of measuring a first and second diversity branch signal-to-noise ratio for the transmit diversity signal received in the first and second diversity branches in the receiver further includes calculating, for first and second diversity branches, a received energy per bit divided by a received noise power.

5. The method for computing a channel quality metric according to claim 1 wherein the step of computing an imbalance compensation factor that is a function of a difference between the first and second diversity branch signal qualities further includes computing a ratio of first and second signal-to-noise ratios corresponding to signal-to-noise ratios of two diversity branches in the receiver.

6. The method for computing a channel quality metric according to claim 1 wherein the step of computing the channel quality metric in response to a difference between the first and second diversity branch signal qualities further includes computing a square root of a product of signal-to-noise ratios of the first and second diversity branches in the receiver.

7. A system for computing a channel quality metric in a receiver in a wireless communications system, wherein a transmitter in the wireless communications system transmits a transmit diversity signal using multiple antennas, the system comprising:

means for measuring a first and second diversity branch signal quality for the transmit diversity signal received in first and second diversity branches in the receiver;

means for computing an imbalance compensation factor that is a function of a difference between the first and second diversity branch signal qualities; and means for computing the channel quality metric in response to the imbalance compensation factor.

8. The system for computing a channel quality metric according to claim 7 wherein the means for computing the channel quality metric in response to the imbalance compensation factor further includes means for dividing one of the first and second diversity branch signal quality measurements by the imbalance compensation factor.

9. The system for computing a channel quality metric according to claim 7 wherein the means for measuring a first and second diversity branch signal quality for the transmit diversity signal received in first and second diversity branches in the receiver further includes means for measuring a first and second diversity branch signal-to-noise ratio for the transmit diversity signal received in the first and second diversity branches in the receiver.

10. The system for computing a channel quality metric according to claim 9 wherein the means for measuring a first and second diversity branch signal-to-noise ratio for the transmit diversity signal received in the first and second diversity branches in the receiver further includes means for calculating, for first and second diversity branches, a received energy per bit divided by a received noise power.

11. The system for computing a channel quality metric according to claim 7 wherein the means for computing an imbalance compensation factor that is a function of a difference between the first and second diversity branch signal qualities further includes means for computing a ratio of first and second signal-to-noise ratios corresponding to signal-to-noise ratios of two diversity branches in the receiver.

12. The system for computing a channel quality metric according to claim 7 wherein the means for computing the channel quality metric in response to a difference between the first and second diversity branch signal qualities further includes means for computing a square root of a product of signal-to-noise ratios of the first and second diversity branches in the receiver.

13. A system for computing a channel quality metric in a receiver in a wireless communications system, wherein a transmitter in the wireless communications system transmits a transmit diversity signal using multiple antennas, the system comprising:

first and second diversity branch signal quality measurers for producing first and second diversity branch quality signals in the receiver in response to receiving the transmit diversity signal; and a channel quality metric computer, coupled to the first and second diversity branch quality signals, for producing a channel quality metric in response to an imbalance compensation factor computed as a function of a difference between the first and second diversity branch quality signals.

14. The system for computing a channel quality metric according to claim 13 wherein the channel quality metric computer further includes a geometric mean computer for computing the geometric mean of the first and second diversity branch quality signals.

15. The system for computing a channel quality metric according to claim 13 wherein the first and second diversity branch signal quality measurers further include first and second diversity branch signal-to-noise measurers.

16. The system for computing a channel quality metric according to claim 13 wherein the channel quality metric computer further includes a lookup table for recalling a channel quality metric computed in a simulator using substantially the same values as the first and second diversity branch quality signals.

* * * * *